RE 25383
Jan. 16, 1962     L. R. MORRILL     3,017,223
AUTOMATIC ROTATION BALANCER
Filed April 8, 1960
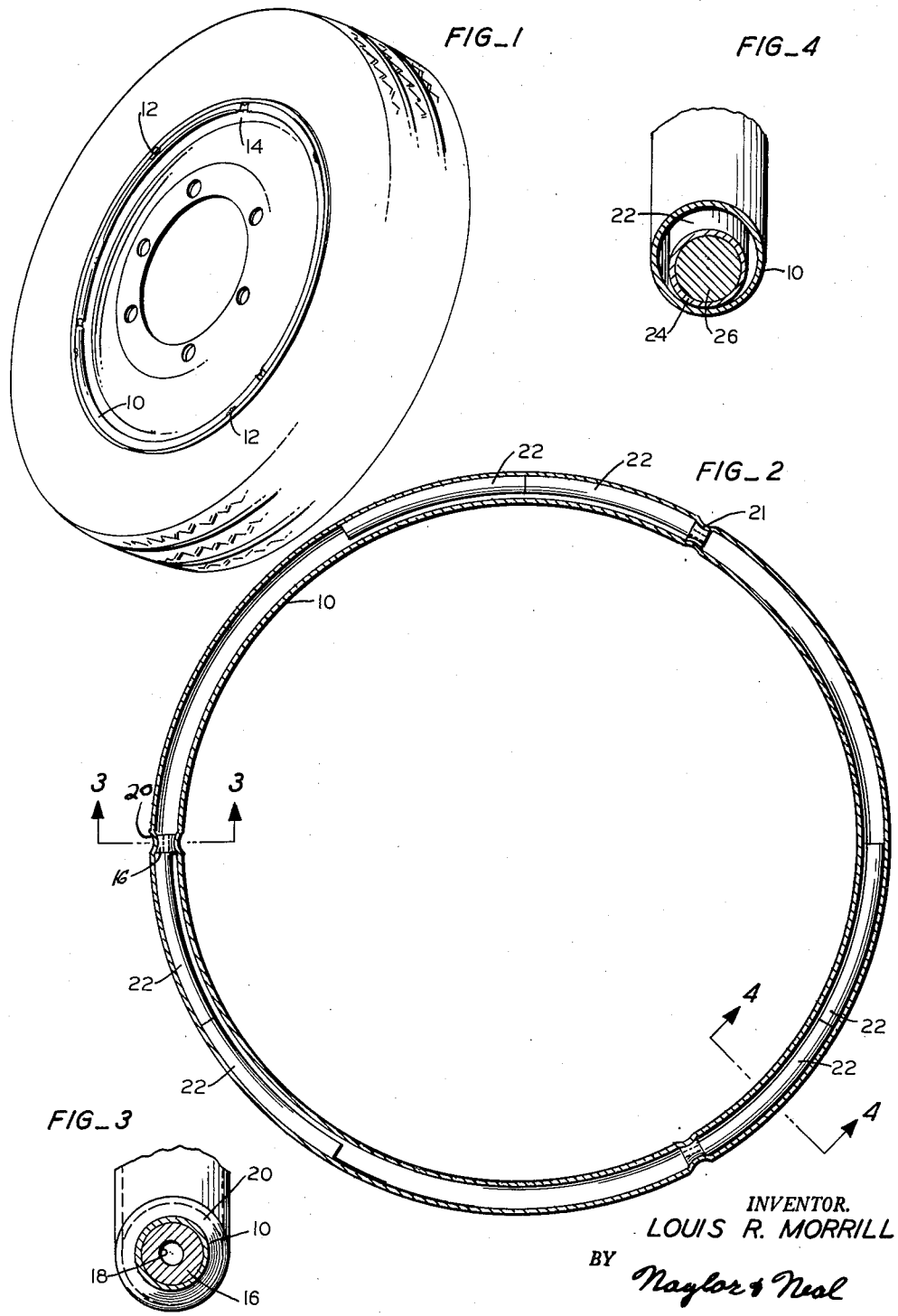
INVENTOR.
LOUIS R. MORRILL
BY Naylor & Neal
ATTORNEYS United States Patent Office 3,017,223
Patented Jan. 16, 1962

3,017,223
AUTOMATIC ROTATION BALANCER
Louis R. Morrill, 3306 Alemany Blvd.,
San Francisco, Calif.
Filed Apr. 8, 1960, Ser. No. 20,972
10 Claims. (Cl. 301—5)

This invention relates to an automatic rotation balancer and more particularly to a simple device which, upon attachment to rotating bodies such as centrifuges, gyroscopes and automobile wheels, will automatically adjust the center of rotation of the body to the axis about which it is desirable to rotate the body.

Various devices have been proposed for automatically balancing rotating bodies, but they have all suffered from major operating disadvantages. Many of these devices operate erratically causing excessive fluctuation between balanced out-of-balance conditions. Many of the devices are too complicated and hence expensive to justify their use in most situations. Many of them are inefficient in that they do not have sufficient balancing capacity and do not effect automatic balancing rapidly enough. Many of them employ working parts which are too noisy in operation to permit their use where quiet operation is desirable. Many of them permit the counterbalancing weights which they employ to become so concentrated during idle periods that excessive initial unbalance usually results every time the automatically balanced equipment is started.

Accordingly, it is a principal object of this invention to provide a simple device for automatically balancing rotating bodies which will operate smoothly and quietly and possess a maximum capacity for balancing eccentric weights.

It is another object of this invention to provide such an automatic rotation balancer which will not permit the accumulation of an excessive unbalance when the automatically balanced device is idle.

It is a more specific object of this invention to provide an automatic rotation balancer in which balancing is effected by movement of counterbalancing weights about a circular raceway which is concentric with the desired axis of rotation of the body to be balanced.

It is another object of the invention to provide counterbalancing weights in such a device where the weights and their raceway contact each other over an elongated surface so that rapid fluctuation of the position of the weights is prevented by sliding of the weights in the raceway.

It is another object of the invention to provide such an automatic rotation balancer which is provided with means for lubricating the weights in their sliding in the raceway and at the same time hydraulically damp the movement of the weights.

It is another object of this invention to provide an automatic rotation balancer which is very simple and inexpensive to construct and which is very rugged in use.

Other objects and advantages of the invention will become apparent from the following description and the annexed drawing in which a specific embodiment of the invention is illustrated and described, this embodiment, however, being but one of the various devices which can be constructed according to the principles of the invention.

In the annexed drawings:

FIGURE 1 is a perspective view of an automobile wheel with the automatic rotation balancer of my invention attached thereto;

FIGURE 2 is a plan view in section of the automatic rotation balancer illustrated in FIGURE 1;

FIGURE 3 is a cross-sectional view of the balancer of FIGURE 2 taken along the plane indicated at 3—3 in FIGURE 2; and FIGURE 4 is a cross-sectional view of the balancer of FIGURE 2, taken along the plane indicated at 4—4 in FIGURE 2.

Broadly stated my invention comprises an automatic rotation balancer comprising a circular raceway, means dividing said raceway into a plurality of arcuate sections with fluid communicating passageways between, a plurality of elongated arcuate weights mounted in said raceway with an equal number of said weights in each of said sections and with the sum of the arcuate length of the weights in each section being less than the length of the section, said weights being formed to permit fluid flow between the ends thereof when they are mounted in said raceway, and a lubricating and motion damping fluid filling said raceway.

Referring now in detail to the drawings, the automatic rotation balancer of this invention comprises a generally toric raceway 10 which is attached by suitable means such as welding 12 or with suitable rim clips to a body to be balanced for rotation, for instance the rim of an automobile wheel 14. The raceway is mounted coaxial with the desired axis of rotation of the body, in this situation the geometric center of wheel 14. The raceway is preferably formed of a steel tube bent into the shape of a tore with the ends of the tube welded together. The major diameter of the raceway is made as large as possible, commensurate with ability to attach it to the rotating body. The larger is the major diameter of the body, the greater is the eccentric weight which can be balanced by the device.

The raceway is provided with three internal plugs 16 which divide the raceway into three equal arcuate sections. The plugs 16 are provided with central passageways 18 therethrough which are substantially smaller than the diameter of the raceway and which provide a restricted fluid passageway between adjacent sections of the raceway. The plugs 16 are provided with annular depressions 20 in the outer surfaces thereof into which the walls of raceway 10 have been depressed to secure plugs 16 against movement relative to raceway 10.

The raceway is conveniently made from a curved length of tubing the ends of which are joined over one of the plugs 16, as at 21.

Each section of the raceway is provided with two equal arcuate weights 22 the total length of which is one-half of the length of the raceway section between its end plugs 16. Each of the weights 22 comprises an outer tubular shell 24 having the shape of a section of a torus with the outside diameter of the shell 24 being slidably less than the inside diameter of the raceway, the "diameter" here meaning the diameter measured parallel to the axis of the raceway, so that clearance is provided around the weights 22 for the passage of fluid as illustrated in FIGURE 4. The outer surface of shell 24 contacts the raceway 10 substantially throughout the lengths of weights 22. The interiors of weights 24 are filled with a suitable heavy material 26 such as lead.

The entire interior of raceway 10 is filled with a suitable liquid such as a light lubricating oil for lubricating the sliding of weights 22 in raceway 10. The liquid also serves to damp rapid movement of weights 22 since the passageways 18 in plugs 16 are restricted in size and since the clearance around weights 22 in raceway 10 is relatively small.

The most desirable clearance to be provided between the weights 22 and the inside wall of the raceway 10 depends on a large number of factors, namely: the size of the rotating body which is to be counterbalanced, the viscosity of the fluid in the raceway, the size of passageways 18 in plugs 16, etc.

In operation, the device of this invention functions smoothly and quietly to automatically balance rotation of the body to which it is attached. When the body, because of unbalance, starts to rotate about an axis spaced from the geometric axis of raceway 10, the weights in the raceway will be able to move in the raceway with a radial component with respect to the actual axis of rotation. This movement of the weights continues until the weights counterbalance the unbalance of the body on which the balancer is mounted and thereafter the device will rotate about the geometric axis of the raceway. The elongated contact area between the weights and the raceway and the damping action of the fluid in the raceway prevent too rapid motion of the weights and hence prevent the weights from "overbalancing" the device so that substantial fluctuation in and out of balance is not necessary before a steady state is reached.

When the weight distribution of the body is changed, the positions of weights 22 will change immediately to balance the body. When the balancer is mounted in a vertical position, as it is on automobile wheels, and when the balancer is idle, there is some tendency for the weights to fall to the bottom of the raceway. This falling of the counterbalancing weights is substantially limited in the automatic rotation balancer of my invention by reason of the provision of the plugs 16 and the elongated shape of the weights 22; the plugs 16 prevent the weights from moving out of the raceway sector in which they are mounted and the elongated shape of the weights tends to hold in place the weights which are located near the top and bottom areas of the raceway. These two features of the device are sufficiently efficient in maintaining the balancing positions of the weights where the device is at rest that I have found it unnecessary to provide movable or resilient means to hold the weights in place when the device is idle; serious unbalance of the device when it is initially put in motion does not result with the automatic rotation balancer of my invention.

While a specific embodiment of the invention has been illustrated and described in detail herein, many other devices may be constructed in accordance with the principles of my invention, and, accordingly, the invention is defined by the expressions of the following claims and the equivalents to be afforded thereto.

What is claimed is:

1. An automatic rotation balancer comprising a circular raceway, means dividing said raceway into a plurality of arcuate sections with fluid communicating passageways therebetween, a plurality of solid elongated weights movably mounted in said raceway with an equal number of said weights in each of said sections and with the sum of the lengths of the weights in each section measured along the arcuate length of the section being less than the length of the section, said weights being formed to permit fluid flow along the lengths thereof between the ends thereof when they are mounted in said raceway, and a lubricating and motion damping fluid filling said raceway.

2. The automatic rotation balancer of claim 1 in which the combined lengths of the weights in each of said sections is about one-half of the length of the section.

3. The automatic rotation balancer of claim 1 in which said raceway is divided into an odd number of sections by said dividing means and an even number of said weights is provided in each of said sections.

4. The automatic rotation balancer of claim 1 in which said dividing means comprises a plug in said raceway with a restricted passageway extending therethrough connecting the raceway sections which said plug separates and having an annular depression in the outer surface of said plug with the walls of said raceway extending into said depression.

5. A device for automatically balancing rotating bodies which comprises a continuous tubular raceway having the general shape of a tore and adapted to be mounted on a body coaxial with the axis of rotation thereof, an odd number of divider plugs mounted in said raceway and dividing said raceway into an odd number of equal length arcuate sections, said plugs provided with central restricted passageways therethrough providing fluid communication between adjacent sections, an even number of elongated arcuate solid weights movably mounted in each of said sections with the combined length of the weights in each section equal to about one-half of the length of the section, said weights being generally circular in cross section and having a diameter less than the internal diameter of said raceway, and a lubricating and motion damping fluid filling said raceway.

6. The device of claim 5 in which said raceway is divided into three arcuate sections by said plugs and each of said sections contains two of said weights with the length of each weight having about one-fourth of the length of the section between said plugs.

7. The device of claim 5 in which said plugs are provided with peripheral depressions therein and the walls of said raceway extend into said depressions to secure said plugs against movement with respect to said raceway.

8. The device of claim 5 in which the surface of each of said weights adjacent to the radially outer surface of the raceway contacts the wall of said raceway throughout the length of said weights.

9. An automatic rotation balancer adapted to be attached easily to the rim of an automobile wheel which comprises a tube curved in a closed circular loop with the diameter of said tube being substantially smaller than the diameter of said loop, the interior of said tube defining a circular raceway having the shape of a tore, at least three divider plugs rigidly mounted in said tube dividing said raceway into at least three sections of substantially equal arcuate length, and at least two solid arcuate weights movably mounted in each of said sections of said raceway, said arcuate weights having arc diameters generally equal to the mean diameter of said loop and each of said weights having a diameter less than the inside diameter of said tube and a length greater than the inside diameter of said tube.

10. An automatically balanced automobile wheel adapted to be mounted on an automobile for rotation about a central axis which comprises a metal rim having a central axis and a circular periphery and central means for mounting said rim on an automobile for rotation about said axis, a tire mounted on the periphery of said rim and extending radially outwardly therefrom, and means for automatically balancing said wheel which comprises a tube curved in a closed circular loop with the diameter of said tube being substantially smaller than the diameter of said loop, means rigidly attaching said tube to said rim with said tube extending along the periphery of said rim, the interior of said tube defining a circular raceway having the shape of a tore coaxial with said axis, at least three divider plugs rigidly mounted in said tube dividing said raceway into at least three sections of substantially equal arcuate length, and at least two solid arcuate weights movably mounted in each of said sections of said raceway, said arcuate weights having arc diameters generally equal to the mean diameter of said loop and each of said weights having a diameter less than the inside diameter of said tube and a length greater than the inside diameter of said tube.

References Cited in the file of this patent

UNITED STATES PATENTS

| | | |
|---|---|---|
| 1,159,052 | Leblanc | Nov. 2, 1915 |
| 1,620,871 | Carrey | Mar. 15, 1927 |
| 2,441,619 | Dailey et al. | May 18, 1948 |
| 2,485,936 | Stroberg | Oct. 25, 1949 |
| 2,659,243 | Darrieus | Nov. 17, 1953 |
| 2,687,918 | Bell et al. | Aug. 31, 1954 |
| 2,778,243 | Darrieus | Jan. 22, 1957 |
| 2,801,883 | Householder | Aug. 6, 1957 |